2,706,729
Patented Apr. 19, 1955

2,706,729
METHOD FOR PREPARING MELAMINE FROM DICYANODIAMIDE

Franz Kaess, Trostberg, Ernst Doehlemann, Thalham-Altenmarkt, and Franz Maresch, Trostberg, Germany, assignors to Sueddeutsche Kalkstickstoff-Werke A. G., Trostberg, Germany, a firm No Drawing. Application December 16, 1950, Serial No. 201,236

Claims priority, application Germany February 10, 1950

3 Claims. (Cl. 260—249.7)

The invention relates to the method for preparing melamine from diacyanodiamide.

In order to attain a complete conversion of dicyanodiamide in the preparation of melamine it has been proposed to carry out the reaction in the presence of inert gases or of ammonia under high pressure. The yields obtainable according to those methods amounted to 88.5 per cent of melamine, i. e. they were rather small.

A principal object of the invention is to provide a method of converting dicyanodiamide with high yields into melamine in the presence of gases under pressure.

Other objects and advantages will be apparent from a consideration of the specification and claims.

We have found that much higher yields of melamine than heretobefore possible can be obtained when the conversion of dicyanodiamide is carried out under pressure with a mixture of inert gases and ammonia. It appears that the presence of such a mixture produces a completely unexpected effect on the conversion which is by far superior to the effect exerted by the components alone.

Our novel method is of particular advantage when the starting material containing the dicyanodiamide is ignited by heating means located inside said material whereupon the conversion is completed by the exothermy of the reaction itself without further supply of heat. This heating method is described in more detail in our copending application, Serial No. 182,194, filed August 30, 1950.

The gas mixture used in our method consists of nitrogen and/or hydrogen or other indifferent gases and ammonia. The amount of ammonia should not exceed 60 per cent of the volume of the gas mixture and be not less than 20 per cent to prevent disamination of the dicyanodiamide. In order to obtain optimum yields, the amount of the gas mixture present is so adjusted as to amount to at least 6 per cent by weight of the dicyanodiamide.

The method presents the opportunity of working almost without any consumption of energy because the reaction needs only igniting for getting started and the required temperature of 200° C. and more is reached by the heat of the reaction itself. Surprisingly it has been found that even temperatures exceeding 300° C. do not decrease the high yields.

The best results are obtained when the dicyanodiamide is reacted upon in agglomerated condition, but it is not necessary to fill it in the reaction vessel under pressure; it is sufficient to densify the dicyanodiamide by simple manipulation, such as kneading, rolling, tableting, briquetting, and the like. Tablets or briquets are readily made by admixture of high-boiling hydrocarbons such as tetraline. These admixtures need not be removed before the dicyanodiamide is subjected to the reaction. The yields correspond to a substantially quantitative conversion of dicyanodiamide to melamine.

The following examples are given to illustrate the method of the invention and are not to be considered as limiting the invention. All parts and percentages are given by weight.

Example 1

A mixture of 36 parts of dicyanodiamide, densified by kneading, 4.3 per cent of nitrogen and 1.7 per cent of ammonia were enclosed in an autoclave and brought to reaction by a centrally inserted electric resistor.

The temperature rose to 270–300° C. and the pressure to 90–100 atm.

35.8 parts of a 97 per cent melamine were obtained.

Example 2

30 parts of dicyanodiamide were briquetted with 5 per cent of tetraline (tetrahydronaphthalene) and without drying treated as described in Example 1.

31.4 parts of a product were obtained which, after drying, corresponded to a 96 per cent melamine.

What we claim is:

1. A method of preparing melamine comprising the steps of placing dicyanodiamide in a confined space, filling said space with a gas mixture consisting of non-reacting gases and ammonia in an amount of about 20 to 60 per cent by volume of said gas mixture, heating only a central part of said dicyanodiamine to a temperature not exceeding 300° C., discontinuing the supply of heat before the entire mass of the dicyanodiamide has been heated to reaction temperature, and allowing the reaction to spread from the initially heated part throughout the entire mass.

2. A method as defined in claim 1 wherein the non-reacting gas is nitrogen and the weight of the gas mixture is at least 6 per cent of the weight of the dicyanodiamide.

3. A method as defined in claim 1 wherein agglomerated dicyanodiamide is used.

References Cited in the file of this patent

UNITED STATES PATENTS

| 2,161,940 | Widmer | June 13, 1939 |
| 2,164,705 | Fisch | July 4, 1939 |
| 2,170,491 | Widmer | Aug. 22, 1939 |
| 2,180,295 | Jayne | Nov. 14, 1939 |
| 2,341,180 | Jayne | Feb. 8, 1944 |

FOREIGN PATENTS

| 533,426 | Great Britain | 1941 |
| 625,305 | Great Britain | 1949 |
| 933,241 | France | Dec. 17, 1947 |